Jan. 26, 1937.  J. G. RAY  2,069,047
AIRCRAFT CONTROL
Original Filed Dec. 3, 1931
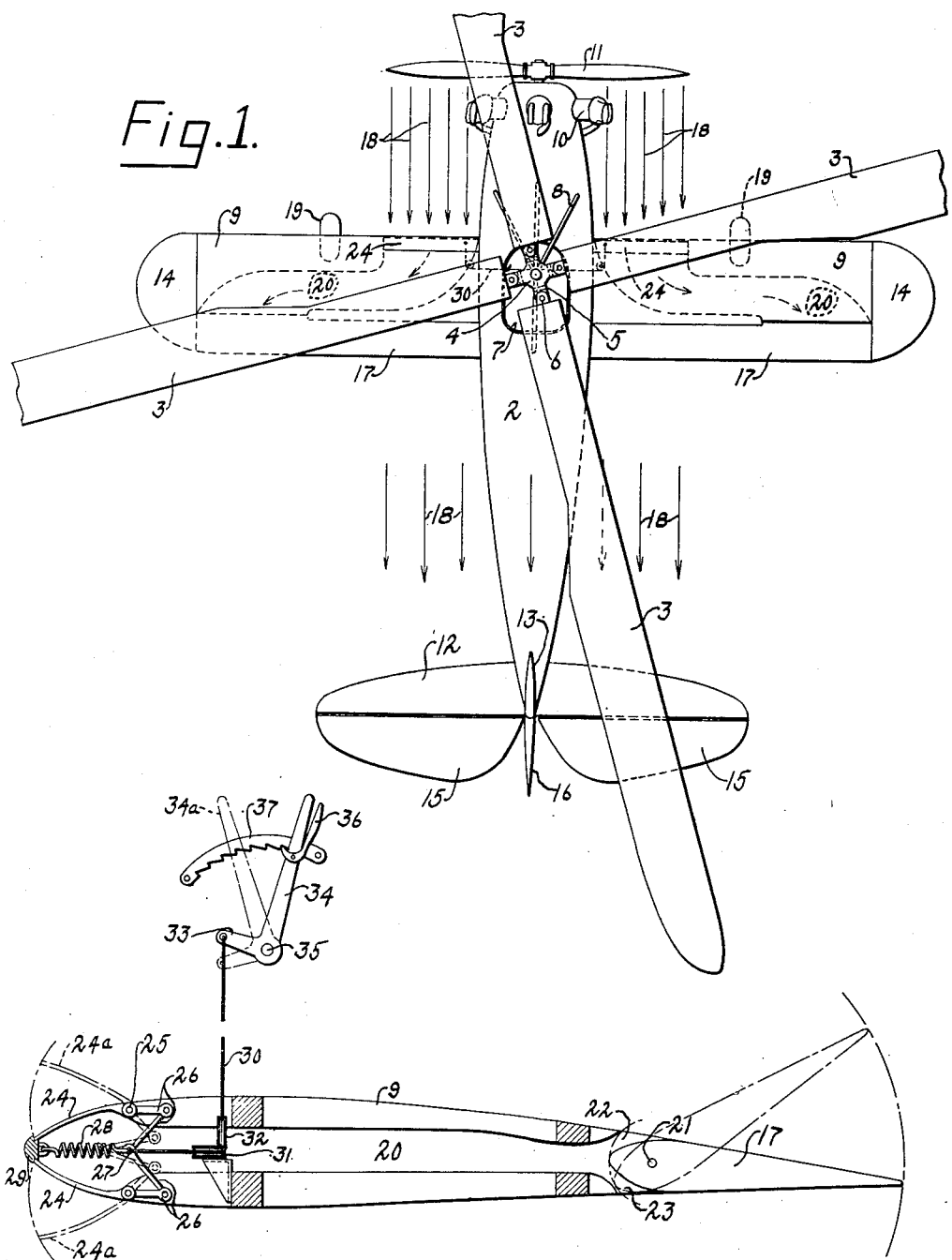

Patented Jan. 26, 1937

2,069,047

UNITED STATES PATENT OFFICE 2,069,047

AIRCRAFT CONTROL

James G. Ray, Hatboro, Pa., assignor to Autogiro Company of America, Philadelphia, Pa., a corporation of Delaware Application December 3, 1931, Serial No. 578,653
Renewed March 4, 1935

1 Claim. (Cl. 244—8)

This invention relates to aircraft control and particularly to the longitudinal, directional, and lateral control of aircraft supported by a freely-rotative, air-driven, pivoted-wing system.

In aircraft of the type shown in patent to Juan de la Cierva No. 1,590,497, issued June 29, 1926, an improved form of which is disclosed in a co-pending application of the said inventor, Serial No. 500,064, filed December 4, 1930, (issued February 20, 1934, as Patent No. 1,947,901), the primary sustention of the craft is by means of a system of rotative wings which are individually flexibly connected, as by hinge joints, to a common rotative axis. Sustention of such craft is effected by the rotative wings as the latter are turned by relative air flow produced by drawing the craft through the air by means of its forward propeller. As is also now known, substantially vertical descent may be obtained in such an aircraft, with the engine throttled or shut off.

In view of the fact that such a machine may move slowly with safety, and even descend and land with no forward speed at all, it has been found that a wide-tread undercarriage is desirable, to provide, in association with the tail skid, a triangular base of support of considerable dimensions. One result of the machine's capability for flying with little or no forward speed is that under certain circumstances, such for example as operation in gusty air or when alighting on irregular ground, the machine may contact with the ground with some side drift or in an undesirable attitude directionally, longitudinally or laterally, or one wheel may contact substantially before the other, whereupon rough landing may result or even damage to the undercarriage or the rotating wings. On the other hand, by virtue of the so-called "pendular" support of the machine from a central point adjacent to which each wing is hinged for force-compensating movements, the machine has, under normal conditions, very good inherent stability.

I propose, by the present invention, to render the control of such an aircraft highly effective at very low translational speeds, so that the degree of control shall be more nearly commensurate with the degree of stability, and thus render the machine of greater all around usefulness and make it as free from damage as it is free from danger. In accomplishing this end, I make it fully feasible to utilize a very wide undercarriage, with the attendant advantages thereof, while eliminating the disadvantages of such a wide undercarriage, such as tendency to turn sharply on the ground or roll over, as is likely to occur where one wheel of such a wide undercarriage makes contact before the other, as when handled by a novice.

More specifically, my invention contemplates the utilization of slipstream from the propelling means in a novel and very effective manner for sensitizing all of the controls, and especially the lateral controls, at very slow speeds of forward movement; and further, the combining of such action with the stabilizing effect resulting from and peculiar to the rotative wing system just referred to.

In general, I contemplate an arrangement of propulsion means, and longitudinal, directional and lateral control means such that a very effective action of slip-stream from the propulsion means may at any time be had upon all of the control means; and thereby at the same time enhance the benefits and advantages normally derived from the rotative wings.

I further contemplate, in combination with the primary sustaining system of rotative wings, a supplemental fixed-wing sustaining system which serves a manifold purpose, that is: to take a progressively increasing share of the lift in forward flight, to support fixed stabilizing surfaces at the most effective points, to provide a wide base for the mounting of the wide undercarriage, to carry controllable ailerons, and to serve as a means for conveying slipstream from the propelling means out to and over the outer portions of the ailerons, which portions are located laterally outward at some distance from the center of gravity where their action is most effective. In furtherance of their last named function, I preferably provide the fixed wings with air ducts or channels extending from their leading edges in the zone of the slipstream to their trailing edges adjacent the outer portions of the ailerons.

The invention further contemplates means for closing such air ducts, so as to provide a smooth streamline wing contour, for efficient forward flight, and the opening of said ducts by means of gates or scoops which intercept a relatively large portion of the slipstream and thus intensify the action thereof over the ailerons, for control under conditions when the machine is in substantially vertical descent.

For a full comprehension of the advantages of this arrangement, it should be noted that the tail surfaces, including rudder and elevator, are located at a substantial distance from the normal center of gravity of the machine, and substantially in the direct path of the slipstream from the propelling means, so that they are made quite effective for control at low forward speeds, by speeding up the engine when making a steep landing in restricted area. In so operating the machine, with the ordinary type of construction of fixed wings and ailerons, the sudden application of the torque of the engine may under certain circumstances more than counterbalance the effectiveness of the slipstream thus produced upon the inner portions of the ailerons; but by my improvements, the slipstream is made substantially equally effective on all the control surfaces, and this, in combination with the inherent pendular stability of the craft by virtue of the rotor, gives ample control at even zero forward speed.

How the foregoing objects and advantages, together with such others as may be incident to the invention or as may occur to those skilled in this art, are obtained, will be evident from the following description, taken together with the accompanying drawing, in which drawing:—

Figure 1 is a fragmentary top plan view of an aircraft of the freely wind-driven rotative wing type, embodying the present invention; and Figure 2 is an enlarged section, with certain parts in elevation, of certain details of the invention, the section being taken irregularly through the left-hand fixed wing of Figure 1, from adjacent the fuselage to a point near the outer end of the wing.

Above the body or fuselage 2 of the machine there is provided an air rotated sustaining wing system comprising wings or blades 3 individually flexibly connected to a common rotatably mounted hub 4, as by means of horizontal and vertical pivot pins 5, 6. The axis 4 may be mounted above the cockpit 7 by means of several struts or legs 8. In addition to the rotative sustaining system, a supplemental system including fixed wings 9 may be employed, said fixed wings taking little or no lift in vertical descent, but assuming an increasing proportion of the lift with increase in forward speed, in accordance with the disclosure of the aforementioned application of Juan de la Cierva.

The machine is propelled by an engine 10 and propeller 11; is stabilized by means of a stabilizer 12, vertical fin 13, and laterally spaced upturned wing tips 14; and is controlled by elevators 15, rudder 16, and ailerons 17. All of the control surfaces are preferably mounted, as shown, within the influence of the slipstream of the propeller 11, indicated at 18 by a plurality of arrows.

Beneath the fixed wings, and preferably acting thereagainst, are landing elements such as wheels 19, which are widely spaced apart, for purposes hereinbefore stated.

Associated with each fixed wing, and preferably formed within the same, is an air duct or passage 20, which is preferably of curved contour, as seen in plan, so as to offer a minimum of resistance to the air flow therethrough. At their rear, outlet, ends the passages 20 open at the nose or point of pivotation 21 of the ailerons, at their outer extremities, so as to divide the air flow, as at 22, 23 to pass over the upper and lower surfaces of the ailerons. If desired, the pivot 21 may be so located (as shown in Figure 2) that, upon deflection of the aileron, one of the openings 22 or 23 is partially or fully blocked by the nose portion of aileron 17, so that most of the air flow is directed against the forward side of the deflected aileron, to increase the positive pressure.

The front, intake, end of each passage 20 is adjacent the fuselage, as shown, and is normally closed by a pair of flaps or scoops 24, each pivoted at 25 to the fixed wing. Jointed lever systems 26, 26, each connected to an axis 25, are interconnected at 27, and thence connected by a tension spring 28 to the nose piece 29 of the wing.

An operating cable 30, connected at point 27, passes over pulleys 31, 32 (mounted in the fixed wing) to an arm 33 of a control lever 34 which is pivoted at 35 in the cockpit. Said lever may have a latch 36 engaging notches in a quadrant 37, so that when the lever is moved to the full line position in Figure 2, the flaps 24 will be held in closed position. When the lever 34 is moved to position 34a the spring 28 will move the flaps 24 to their open positions 24a. Slipstream against the flaps, as they open, tends to assist the spring 28 in its action and to automatically maintain the flaps in open position until positively returned by the control lever.

It will readily be seen that, when coming in for a landing, the pilot, by throwing the lever forward (to position 34a), may open the flaps 24 and cause an inrush of air into the passage 20 which will produce increased aileron effectiveness by causing a rush of air over the outer portion of the aileron. If there is little or no forward speed, when nearing the ground, as in vertical descent, even partial opening of the throttle will produce a considerable flow of air, not only over the rudder and elevators, but also over the most effective portion of the ailerons, so that at the very moment of landing, the action of the slipstream from the propeller will produce effective action of all of the controls, whereby the detrimental effects of gusts of wind, drift, lateral tilt, irregular ground, engine torque, and the like, may be overcome.

I claim:—

In an aircraft, a primary sustaining system comprising an upright hub structure mounted so that it may be freely rotated, sustaining wings or blades pivoted on said structure in position to be rotated by relative air flow whereby substantially vertical descent may be obtained, means of forward propulsion for the craft, fixed wing means extending laterally of the craft, controllable ailerons on said fixed wings, air conduits in said fixed wings extending from zones in the path of travel of slipstream from said forward propulsion means to zones adjacent the most effective area of said ailerons, said conduits having inlets at said first mentioned zones and outlets at said second mentioned zones, closure means for said inlets, releasable latch means for holding said closure means in closed position, and resilient means normally urging said closure means to open position so as to supplement the action of the slipstream in holding the closure means open, upon release of the latch, whereby to assure concentration of slipstream over said effective portion of the ailerons at low speeds and in vertical descent.

JAMES G. RAY.